Oct. 2, 1956
V. ZONA
2,764,779
METHODS AND APPARATUS FOR FEEDING CONTINUOUS-OPERATION
MIXERS FOR THE INGREDIENTS OF PLASTIC BASE
(E.G. RUBBER BASE) COMPOSITIONS
Filed April 24, 1951
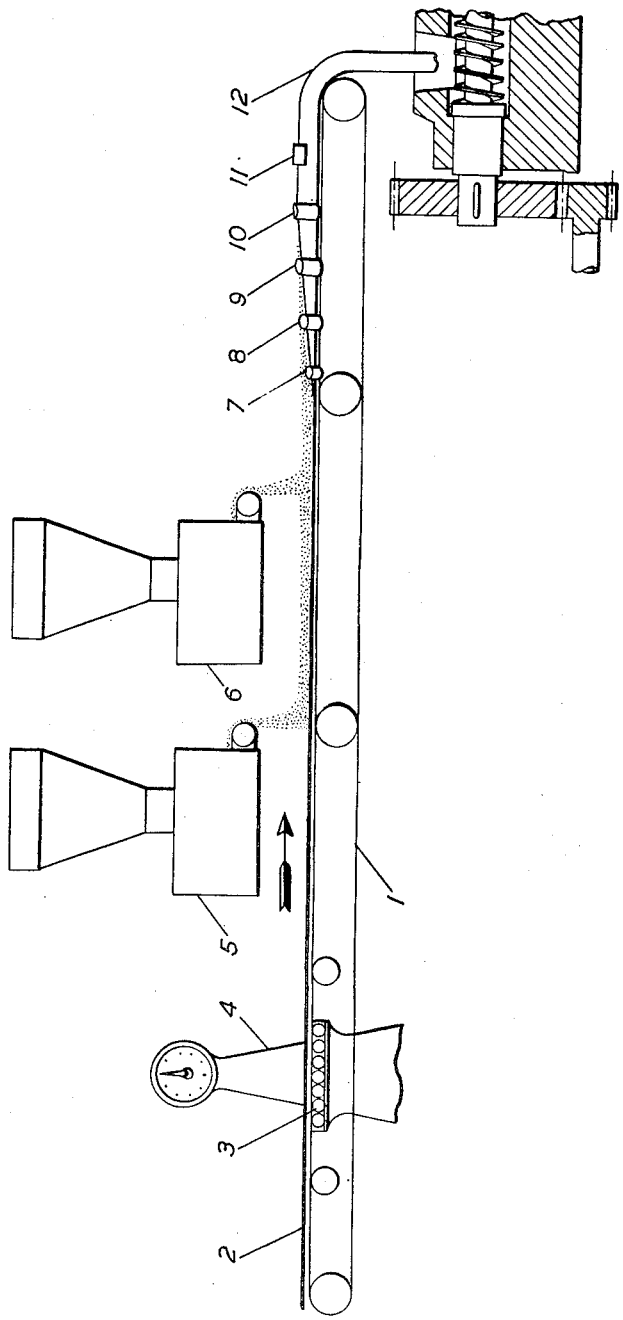
Inventor
Vittorio Zona
By
Attorneys United States Patent Office 2,764,779
Patented Oct. 2, 1956

2,764,779

METHODS AND APPARATUS FOR FEEDING CONTINUOUS-OPERATION MIXERS FOR THE INGREDIENTS OF PLASTIC BASE (E. G. RUBBER BASE) COMPOSITIONS

Vittorio Zona, Milan, Italy, assignor to Pirelli Societa per Azioni, Milan, Italy, a limited liability company of Italy Application April 24, 1951, Serial No. 222,598

6 Claims. (Cl. 18—2)

This invention relates to methods and apparatus for feeding continuous-operation mixers for the ingredients of plastic base (e. g. rubber base) compositions.

In the specification of United States Patent 2,485,254 and of United Kingdom Patent No. 636,713 a continuous-operation mixer as above referred to is described comprising a hollow cylindrical mixer body within which is a rotor adapted to mix the ingredients of the plastic base composition to be formed as at the same time the materials are advanced along the interior space of the mixer body from an inlet thereto at one end of the body to an outlet at the other end thereof. The rubber or other plastic base of the composition to be formed and the balance of the ingredients to be admixed therewith are fed into the machine by way of a hopper communicating with the inlet referred to and the manner of operation of the rotor is such that the materials are caught between the rotor and the internal wall of the mixer body and thoroughly intermixed with one another as they are advanced by the rotor along the body, the resulting composition being ejected from the body under thrust from the rotor as a continuous mass, e. g. in strip form.

Naturally, with the use of a mixer of the foregoing description, the composition will be of uniform consistency and quality only if the feeding of the mixer be performed in such a manner that the relative proportions by weight of the rubber or other plastic and the balance of the ingredients to form the composition, as predetermined for the purposes of the operation in hand, are maintained constant throughout the feed, with the result that if the rate of feed is uniform the same relative quantities of the various materials to form the composition are fed into the machine each unit period of time throughout the feeding of the machine. The object of the present invention is to provide a practical form of means for realising this essential condition.

Heretofore it has been usual, in feeding a mixer as referred to above, to add to a given weight of the rubber or other plastic base material of the composition to be formed a predetermined quantity of each of the other ingredients of the composition, which other ingredients may be either pulverulent or granular or in some cases liquid.

According to the present invention, a method of simultaneously feeding into a continuous-operation mixer the ingredients to be admixed therein of a composition having a basis of rubber or a like plastic and containing one or more ingredients (pulverulent, granular or liquid) additional thereto is provided, according to which the additional ingredient or ingredients is or are first deposited on to a strip of the rubber or like plastic, the strip is then closed around the additional ingredient or ingredients and the resulting formation consisting of the additional ingredient or ingredients enclosed within a surrounding casing of the rubber or like plastic ingredient, is fed in this form into the mixer.

According to one generally preferred form of the invention, the formation consisting of the additional ingredient or ingredients enclosed within a surrounding casing of the rubber or like plastic ingredient is fed into the mixer as it is formed, being formed in a continuous manner.

According to a generally preferred form of the invention, the additional ingredient or ingredients is or are deposited on to the strip in a continuous stream or streams lengthwise of the strip and in a predetermined quantity or quantities which is or are uniformly proportional at any given point along the strip to the quantity of plastic at that point per unit of length of the strip, with the result that the formation which is fed into the mixer comprises at all points along the length thereof precisely the same relative proportions of the ingredients to be admixed.

The invention includes apparatus for carrying into effect the method set forth in the preceding paragraph, said apparatus comprising (A) means for feeding a strip of the rubber or other plastic ingredient of the composition to be formed in the mixer, past a point or points whereat the additional ingredient or ingredients is or are deposited on to the strip, (B) at said point or points, one or more automatic feeding devices for the additional ingredient or ingredients operating synchronously with the strip feeding means and at such a rate or rates as at all times to proportionate the quantity or quantities of the additional ingredient or ingredients to the quantity of plastic per unit of length of the strip thereof as regards the portion of the strip which at any given moment is passing the feeding device or devices and (C) means for bending the strip around the deposit of additional ingredient or ingredients so as to encase the same therewithin.

Further according to the invention, the feeding device or devices for the additional ingredient or ingredients are of variable delivery capacity and its or their delivery capacity or capacities is or are automatically and in a continuous manner maintained strictly proportional to the weight per unit of length of the strip of plastic as regards the portion thereof which at any given moment in the operation of the apparatus is passing the feeding device or devices, by mechanism controlled by the operative movements of a weighing device and with said weighing device, forming part of the apparatus.

The improvements which are provided by the present invention very considerably facilitate the dispersion of the additional ingredient or ingredients in the rubber or other plastic base material of the composition to be formed, on account of the fact that the casing of thin sheet rubber or other plastic surrounding the ingredient or ingredients is of the most suitable shape and occupies the most suitable position to convey into the mixer all of the materials to be admixed therein.

The invention will now be further described with reference to the accompanying drawing, which shows the improved feed apparatus of the invention according to the generally preferred form thereof referred to above.

The apparatus shown comprises an endless belt conveyor 1. On to this conveyor, at one end thereof, is fed, in the form of a continuous strip 2, the rubber or other plastic base ingredient of the composition to be formed, the strip being supplied from a machine (not shown) in which it has been formed, for instance an extruder or calender.

The upper lap of the conveyor 1 travels in the direction of the arrow and conveys the strip 2 past a series of rolls 3 which constitute the scale of a weighing apparatus 4.

After passing the weighing apparatus 4 the strip passes beneath the delivery mouth or mouths of one or more feeders 5, 6 for the additional ingredient or ingredients of the composition to be formed, said feeders 5, 6 being adapted to deliver the ingredient or ingredients at an accurately predetermined rate bearing a fixed ratio to the rate of feed of the strip 2 past the feeders, under the control of the weighing apparatus 4.

In the arrangement shown there are only two feeders. Obviously, however, any necessary number either less or greater than two may be employed, according to the number and character of the ingredients to be admixed with the rubber or other plastic base of the composition to be formed in the mixer. For example, in a case where one or more of the ingredients are in powdered form, one or more in granular form and one or more in liquid form, three separate feeders could be employed for feeding respectively the three forms of ingredients. On the other hand a single feeder could be used if the ingredients are of a character such that they can be satisfactorily premixed and then fed in this condition on to the strip 2 in the required predetermined relative proportions to one another and to the strip.

As soon as the strip 2 has received upon it all of the balance of the ingredients to form the composition it is conveyed, still in position on the belt 1, to a device which progressively lifts the two side edges of the strip and then joins them so as virtually to transform the strip into a hose-like casing 12 completely encircling the ingredients which have been deposited on to the strip from the feeding devices.

According to the arrangement shown, this device (which as will be appreciated is illustrated only diagrammatically) comprises a series of rolls 7, 8, 9, 10, functioning progressively to raise the edges of the strip, eventually bringing them together, and a pair of pressure rollers 11 disposed horizontally and functioning to compress the edges which have been brought together by the rolls 7, 8, 9, 10, into union with one another.

It will be appreciated that the tubular formation 12, which as appears from the drawing is fed as such into the mixer, can be formed in any other desired manner than that which has been described with reference to the drawing. For example, it could be formed from two separate strips of rubber or other plastic base material superimposed upon one another and joined together along the edges, it being understood of course that the additional ingredient or ingredients to form the composition would be fed on to one of the strips before the other had been superimposed upon it.

The weighing apparatus 4 (or the weighing apparatuses if more than one are employed in the machine) are preferably of the gravimetric type, either with mechanical or magnetic vibration as in the case, for instance, of the weighing machines which are manufactured by Builders' Iron Foundry of Providence, Rhode Island, United States of America, or Buhler, of Uzwell, Switzerland. In any case, the weighing apparatus should be provided with a double load regulating system, one part of the system being allocated to maintaining the rate of delivery of the ingredient or ingredients from the feeding device or devices associated with the weighing apparatus in perfect correspondence to the delivery setting of the feeding device or devices, and the other being allocated to the function of automatically varying the delivery setting of the feeding device or devices in exact proportionality to any variation in the weight per unit of length of the rubber or other plastic base strip 2 as it passes over the scale of the weighing apparatus, such variation being due, for example, to accidental causes. In this way it is ensured that the delivery rate in terms of weight of the feeding device or devices shall bear an exact and uniform ratio to the feed rate in terms of weight of the strip 2, and therefore that the feed of the various materials to form the composition to be produced in the mixer shall be constant throughout the period of feed of the machine as regards relative proportions by weight of the ingredients to be admixed therein.

What I claim as my invention and desire to secure by Letters Patent of the United States is:

1. In an apparatus for combining in accurately predetermined proportions the ingredients of a composition to be formed, one of which ingredients being a plastic such as rubber and the said proportions being strictly identical at all positions along the product of the combining operation, the combination comprising means for continuously conveying along a predetermined horizontal path and at a predetermined uniform rate, a continuous strip composed of said plastic; continuously operating weighing means located at a weighing and dispensing station having a given position along said path, said weighing means being operative continuously to determine the weight per unit length of said strip as successive portions thereof pass said weighing and dispensing station; continuously operating dispensing means also located at said weighing and dispensing station, said dispensing means being operative continuously to deposit another of the ingredients onto the strip as successive portions thereof pass said weighing and dispensing station and comprising for this purpose feed control means which are adjustable to control continuously the rate by weight of deposition of the ingredient onto the strip so that it is strictly proportional at any given moment to said weight per unit length of the strip; and tube forming means for progressively deforming the strip after it has passed the weighing and dispensing station in such a manner as to form it into a tube closed about said other ingredient and forming therewith a filled tube consisting of the ingredients of the composition to be formed in precisely the same relative proportions at all points along the tube.

2. In an apparatus for simultaneously feeding into a mixer the ingredients of a composition to be formed in said mixer, in accurately predetermined proportions and in the form of a continuous composite length, one of said ingredients being a plastic such as rubber and said proportions being strictly identical at all positions along the composite length, the combination comprising means for continuously conveying along a predetermined horizontal path and at a predetermined uniform rate, a continuous strip composed of said plastic; continuously operating weighing means located at a weighing and dispensing station having a given position along said path, said weighing means being operative continuously to determine the weight per unit length of said strip as successive portions thereof pass said weighing and dispensing station; continuously operating dispensing means also located at said weighing and dispensing station, said dispensing means being operative continuously to deposit another of the ingredients onto the strip as successive portions thereof pass said weighing and dispensing station and comprising for this purpose feed control means which are adjustable to control continuously the rate by weight of deposition of the ingredient onto the strip so that it is strictly proportional at any given moment to said weight per unit length of the strip; tube forming means for progressively deforming the strip after it has passed the weighing and dispensing station in such a manner as to form it into a tube closed about said other ingredient and forming therewith a filled tube consisting of the ingredients of the composition to be formed in precisely the same relative proportions at all points along the tube; and means for continuously delivering the filled tube to the inlet of the mixer.

3. The combination of claim 1, the tube forming means being operative by gradually bending upwardly and eventually completely around the ingredient which has been deposited onto the strip, opposite side portions of the strip and finally joining the edges of said side portions so as to seal the wall of the tube thereby formed.

4. The combination of claim 1, the tube forming means consisting of a succession of rollers disposed at spaced positions along the path of travel of the strip and effective gradually to bend upwardly and eventually completely around the ingredient which has been deposited onto the strip, opposite side portions of the strip and finally to join the edges of the side portions so as to seal the wall of the tube thereby formed.

5. The combination of claim 1, there being at least three ingredients in the composition to be formed, namely the ingredient which is fed in the form of a strip and at least two other ingredients, said other ingredients being each deposited onto the strip in the manner recited in the claim, and accordingly at least two dispensing means allocated respectively to the said other ingredients.

6. The combination of claim 2, there being at least three ingredients in the composition to be formed, namely the ingredient which is fed in the form of a strip and at least two other ingredients, said other ingredients being each deposited onto the strip in the manner recited in the claim, and accordingly at least two dispensing means allocated respectively to the said other ingredients.

References Cited in the file of this patent

UNITED STATES PATENTS

| | | |
|---|---|---|
| 1,260,321 | Bulley | Mar. 26, 1918 |
| 1,963,503 | Quinton | June 19, 1934 |
| 1,965,953 | Curtis | July 10, 1934 |
| 2,018,570 | Poetschke | Oct. 22, 1935 |
| 2,051,781 | Brown | Aug. 18, 1936 |
| 2,108,023 | Salemme | Feb. 8, 1938 |
| 2,194,451 | Soubier | Mar. 19, 1940 |
| 2,485,854 | Zona | Oct. 25, 1949 |
| 2,532,871 | Wagner | Dec. 5, 1950 |
| 2,576,444 | Clinefelter | Nov. 27, 1951 |